United States Patent [19]

Asakawa

[11] 4,266,178
[45] May 5, 1981

[54] CHARGE CONTROL CIRCUIT

[75] Inventor: Tatsushi Asakawa, Suwa, Japan

[73] Assignee: Kabushiki Kaisha Suwa Seikosha, Tokyo, Japan

[21] Appl. No.: 839,522

[22] Filed: Oct. 5, 1977

[30] Foreign Application Priority Data

Oct. 5, 1976 [JP] Japan .................................. 51-119641

[51] Int. Cl.$^3$ .............................................. H02J 7/10
[52] U.S. Cl. ................................ 320/39; 320/DIG. 1; 323/906
[58] Field of Search ................ 320/2, 39, 40, DIG. 1; 323/22 T; 340/636; 307/297, 304; 58/23 BA, 23 C; 368/204

[56] References Cited

U.S. PATENT DOCUMENTS

| | | | |
|---|---|---|---|
| 3,447,059 | 5/1969 | Ford et al. | 320/39 X |
| 3,549,983 | 12/1970 | Sprogis | 323/15 |
| 3,553,562 | 1/1971 | Woods | 320/39 |
| 3,636,378 | 1/1972 | Chashi et al. | 307/304 X |
| 3,743,923 | 7/1973 | Steudel | 307/304 X |
| 3,919,618 | 11/1975 | Coleman et al. | 320/39 |
| 3,979,656 | 9/1976 | Takeda et al. | 320/2 |
| 4,043,110 | 8/1977 | Chihara | 340/636 X |

*Primary Examiner*—Robert J. Hickey
*Attorney, Agent, or Firm*—Blum, Kaplan, Friedman, Silberman & Beran

[57] ABSTRACT

A charge control circuit for regulating the current applied to a secondary battery utilized as a power supply in an electronic instrument is provided. The secondary battery is adapted to be charged to a predetermined voltage level in response to a charging current being applied thereto. A charging current is produced by a charging device, such as a solar battery. Voltage regulating circuitry is disposed intermediate the charging device and the secondary battery for detecting the voltage level of the secondary battery and, in response thereto, selectively regulating the application of the charging current to the voltage supply.

24 Claims, 9 Drawing Figures

CHARGE CONTROL CIRCUIT

BACKGROUND OF THE INVENTION

This invention is directed to a charge control circuit for regulating the application of charging current to a secondary battery utilized as a power supply in a small-sized electronic instrument, and in particular to a charge control circuit that detects the voltage level of the battery being charged, and, in response thereto, selectively controls the charging current applied thereto.

In conventional small-size portable electronic instruments, such as electronic wristwatches, pocket calculators and the like, a small-sized, low capacity DC battery is utilized as a power source. For example, mercury oxide or silver oxide batteries having a useful life of one to two years, are utilized as a power supply, the useful life determining the frequency with which the battery must be replaced.

In order to eliminate the inconvenience of having to change batteries in such electronic instruments, secondary batteries have been utilized as a power supply. Although efforts have been made to include solar batteries as charging devices in electronic instruments, the use of secondary batteries for storing the charging voltage, supplied by the solar battery, have produced an unsatisfactory result, due in large measure to the inefficiency of the secondary battery.

Specifically, button shaped Ni-Cd batteries have been utilized as secondary batteries in electronic wristwatches. It is noted, however, that the voltage level of Ni-Cd batteries is often as low as 1.2 V, which is small in comparison with the 1.3 V and 1.5 V operating voltage levels of mercury oxide batteries and silver oxide batteries, respectively. Similarly, the current capacity of Ni-Cd batteries is on the order of 20 mAH, which is small in comparison with the 200 mAH and 165 mAH current capacities provided by mercury oxide batteries and silver oxide batteries, when the Ni-Cd batteries are the same conventional size (11.6 mm$\phi \times$ 5.6 mm) as the silver oxide and mercury oxide batteries. Moreover, Ni-Cd batteries have been found to be more susceptible to leakage than mercury oxide and silver oxide batteries.

It is noted, however, that if mercury oxide or silver oxide batteries, of the type noted above, are utilized as the secondary battery in secondary battery charging arrangements of the type that have heretofore been utilized with Ni-Cd batteries, the likelihood of leakage and/or explosion occurring is greatly increased. The leakage of electrolyte from the battery case or a swelling of the battery case results from the evolution of gas when the secondary battery is overcharged. However, if a secondary battery is selected that can be charged to a satisfactory level, such as 1.8 V for use in an electronic wristwatch, and any charging thereof is inhibited when the voltage level of the secondary battery reaches a satisfactory level, no gas will be generated therein, thereby resulting in a highly effective charging of the secondary battery. Accordingly, a charge control circuit wherein the voltage level of the secondary battery is detected and utilized to control and amount of charging current produced by the charging device in order to effect charging of silver oxide, mercury oxide and also Ni-Cd batteries, is desired.

It is noted that charge control circuits that admit of a high current consumption have been proposed. For example, circuitry, wherein a pulse having a narrow pulse width of several m-sec., is utilized to detect the voltage level of the secondary battery during the short period that pulse is applied thereto. Thereafter, a pulse having a longer pulse width such as several hundred m-sec., is applied at an alternative time, so that the level of the charge control voltage is compared with voltage level of the secondary battery, with the difference therebetween stored in a memory. When the voltage level of the secondary battery is less than the charging-control voltage, a charging current is supplied to the secondary battery. When the voltage level of the secondary battery exceeds the voltage level of the charging voltage a charging current is no longer applied. However, if the secondary battery voltage is elevated above the charging voltage at the time that the respective levels are read into the memory, and the level of the secondary battery is lower than the level of the charing voltage when the shorter pulse is applied thereto, the current consumption in the secondary battery is excessive. Moreover, such circuitry is complex and requires a memory, a pulse generator and other circuit components.

SUMMARY OF THE INVENTION

Generally speaking, in accordance with the instant invention, a charge control circuit for preventing a secondary power supply from being charged above a predetermined voltage level, is provided. The charge control circuitry is particularly comprised of a voltage supply element that can be charged to a predetermined voltage level in response to a charging current being applied thereto. A voltage charger, such as a solar battery or the like is adapted to produce a charging current. A voltage regulator circuit is disposed intermediate the voltage charger and the voltage supply element in order to detect the voltage level of the voltage supply element and in response thereto selectively regulate the application of charging current to the voltage supply element. In a preferred embodiment, the voltage regulating circuitry is adapted to detect when the voltage supply element is charged to a predetermined voltage level, and in response thereto prevent the charging current from being applied thereto.

Accordingly, it is an object of the instant invention to provide an improved charge control circuit for preventing a secondary battery, utilized in a small-sized electronic instrument, from being damaged as a result of overcharging.

A further object of the instant invention is to provide a simple charge control circuit that can be easily utilized in small-sized electronic instruments by being integrated into the same circuit chip as the circuitry for the electronic instrument.

Still a further object of the instant invention is to provide a charge control circuit that admits of reduced current consumption and regulates the charging current applied to the secondary battery in response to detecting the voltage level of the secondary battery.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
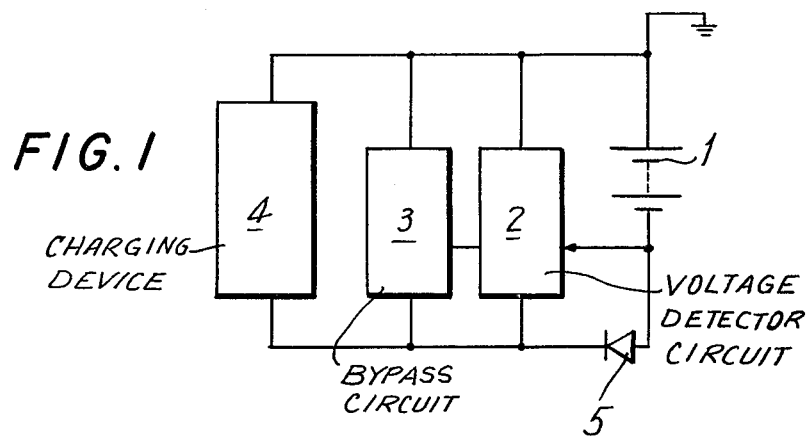
FIG. 1 is a block circuit diagram of a charge control circuit constructed in accordance with a preferred embodiment of the instant invention.

Reference is now made to FIG. 1, wherein a block circuit diagram of a charging control circuit for controlling the charging current applied to a secondary battery is depicted. A charging device 4, such as a solar battery or the like, is adapted to apply a charging current to a secondary battery 1. A voltage detector circuit 2 is adapted to detect the voltage level of the secondary battery and the voltage level resulting from the charging current supplied by the charging device 4 through diode 5 to the secondary batter 1. Diode 5 is provided for preventing reverse currents. The voltage detector circuit 2 is coupled to by-pass circuit 3, which by-pass circuit is adapted to shunt the current produced by the charging device 4, when the voltage detector circuit detects that the voltage level of the secondary battery 1 has increased to a level above that of the charging voltage produced by the charging device 4. As is explained in greater detail below, the voltage detector circuit 2 and by-pass circuit 3 operate as a voltage-regulating circuit for controlling the charging current applied to the secondary battery in response to detecting the voltage level of the secondary battery. To this end, the voltage detector circuit 2 and by-pass circuit 3 are comprised of MOS transistors (insulating gate field effect transistors) which are illustrated in greater detail in FIG. 2. It is noted that MOS transistors are utilized in a preferred embodiment of the instant invention since MOS-IC's or C-MOS-IC's are OFF LOGIC elements and are often utilized in miniaturized electronic instruments such as electronic wristwatches, calculators and the like, having liquid crystal digital displays.

Figure 2:
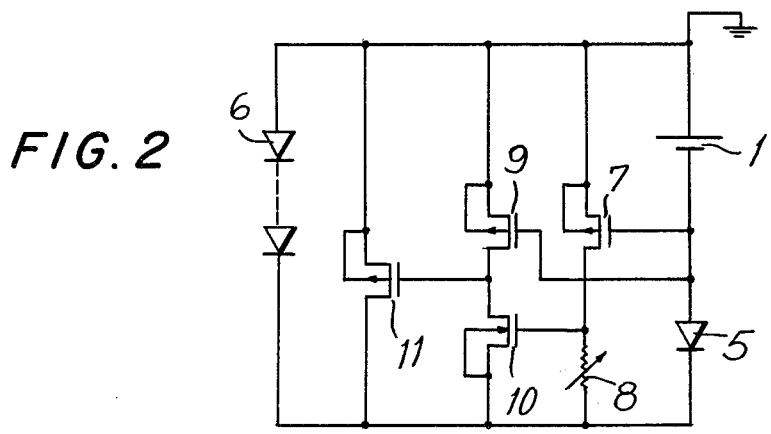
FIG. 2 is a detailed circuit diagram of a charge control circuit constructed in accordance with the preferred embodiment of the instant invention.

Reference is now made to FIG. 2, wherein a detailed circuit diagram of a charge control circuit constructed in accordance with a preferred embodiment of the instant invention is depicted, like reference numerals being utilized to denote like elements depicted above. It is noted that the solar battery 6 is referenced to the negative terminal of secondary battery 1, with the positive terminal of secondary battery 1 being referenced to ground. The voltage detector circuit is comprised of a P-channel transistor 7, a P-channel transistor 9, an N-channel transistor 10 and a variable resistor 8. The source electrodes of P-channel transistor 7 and P-channel transistor 9 are each referenced to ground. The respective gate electrodes 7 and 9 are coupled intermediate diode 5 and the negative terminal of the secondary battery 1. The drain electrode of P-channel transistor 7 is coupled through variable resistor 8 to the negative terminal of the solar battery 6. Finally, the gate electrode of N-channel transistor 10 is coupled intermediate the variable resistor 8 and P-channel transistor 7.

The by-pass circuit 3 is comprised of P-channel transistor 11, which transistor has its gate electrode coupled to the commonly coupled drain electrodes of P-channel transistor 9 and N-channel transistor 10 to be controlled thereby.

It is noted that P-channel transistor 7 is utilized as a voltage level converter and variable resistor 8 is adapted to be controlled from without the electronic instrument to permit a predetermined voltage level to be selected. P-channel transistor 9 and N-channel transistor 10 form a comparator circuit for comparing the voltage level of the secondary battery and the voltage level of the charging voltage, and for controlling the switching characteristic of the by-pass P-channel transistor 11 in response thereto.

Current consumption results on the side of the solar battery because the control electrodes are coupled through diode 5, which is utilized to prevent reverse currents from affecting the operation of the circuitry. Also, the voltage level of the secondary battery is the only input control of the switching characteristic of the P-channel transistors 7 and 9. Accordingly, the instant invention is particularly characterized by the voltage level of the secondary battery being detected on the side of the solar battery, thereby requiring the threshold voltage of the P-channel transistors 7 and 9 to be selected so that same are in a saturated state when the voltage level of the secondary battery is less than the voltage level of the charging voltage and is also less than the voltage level of the solar battery. If the P-channel transistors 7 and 9 are not disposed in a saturated state when the voltage level of the secondary battery is lower than the voltage level of the charging voltage, the current flow through P-channel transistor 7 and/or P-channel 9 to the resistor 8 and N-channel transistor 10, respectively, would depend in large measure on the voltage level of the solar battery, and as a result thereof, charging of the secondary battery would not be controlled by the voltage level of the secondary battery. Accordingly, it is necessary for the P-channel transistors 7 and 9 to be disposed in a saturation state when the voltage level of the secondary battery is below the voltage level of the charging voltage supplied by the solar battery.

In operation, control of the charging of the secondary battery by the charge control circuit, illustrated in FIG. 2, is as follows. When the voltage level of the secondary battery 1 is below the level of the charging voltage, the P-channel transistors 7 and 9 are slightly turned ON thereby referencing the variable resistor 8 and, hence, gate electrode of N-channel transistor 10 to the negative potential of the solar battery. Because the gate electrode of the N-channel transistor 10 is referenced to the negative potential of the solar battery as a result of the negligible current flowing through the resistor 8, the N-channel transistor 10 is turned OFF. Moreover, because the P-channel transistor 9 is turned ON, the output of the comparator defined by P-channel transistor 9 and N-channel transistor 10 is referenced to ground, thereby turning OFF the by-pass channel transistor 11 coupled thereto. Accordingly, the solar battery continues to apply a charging current and voltage to the secondary battery 1, to thereby charge same until the voltage level of the secondary battery is elevated to a level at least equal to that of the charging voltage applied thereto. When the voltage level of the secondary battery reaches the charging control voltage, an increase in current flow through P-channel transistor 7 and variable resistor 8 will result, thereby turning N-channel transistor 10 ON. In response to turning ON N-channel transistor 10, the output of the comparator circuit, defined by transistors 9 and 10, becomes the negative potential of the solar battery and turns ON P-channel transistor 11 to thereby short circuit the current produced by the solar energy and absorb a considerable amount thereof. In response to the by-pass transistor 11 shunting the current thereacross, no further charging current is applied to the secondary battery 1, and hence charging thereof beyond a predetermined level is prevented. Of course, the by-pass transistor 11 must be capable of absorbing at least a portion of the charging current supplied by the solar battery 6, when same is turned ON.

Figure 3:
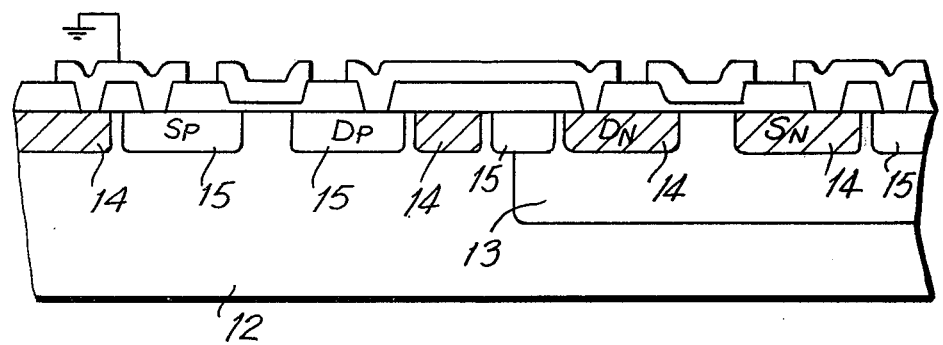
FIG. 3 is a sectional view of a C-MOS circuit of the type to which the instant invention is directed.

Reference is made to FIG. 3, wherein an integrated circuit structure formed on an N-type substrate is depicted. It is noted that the charge control circuit, depicted in FIG. 2, would be formed on a N-type substrate of the type illustrated in FIG. 3, for the reasons detailed above. In C-MOS circuits formed on N-type substrates, the P-channel transistors are formed by utilizing heavily doped P-type diffusion layers 15 diffused in the N-type substrate 12 to define the source region $S_p$ and drain region $D_p$. The N-channel transistor is formed by utilizing a heavily doped N-type diffusion layer 14 diffused into the lightly doped P-well 13 as a source region $S_n$ and drain region $D_n$. Accordingly, a P-channel transistor formed in a N-type substrate cannot be referenced to potentials other than a reference potential, such as the ground potential to which the secondary battery is referenced in FIG. 2. It is noted, however, that because the substrate of the N-channel transistor is isolated from the substrate by P-well 13 in which same is formed, the potential of same can be referenced to a potential considerably lower than that of the N-type substrate. Accordingly, the diode 5, for avoiding reverse currents, is not integrated on the circuit ship, but instead is coupled thereto on the negative side of the secondary battery, so that the voltage level of the secondary battery, detected by the gate electrode of P-channel transistor 7 and variable resistor 8, is utilized to reference the gate electrode of N-channel transistor 10.

Figure 4:
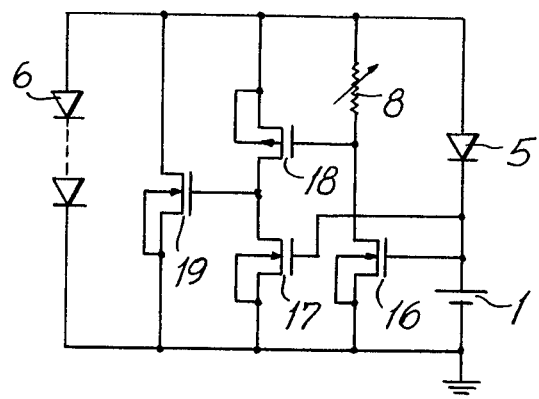
FIGS. 4, 5, 6 and 7 are detailed circuit diagrams of charge control circuits of the type depicted in FIG. 2, constructed in accordance with alternative embodiments of the instant invention.

If the IC circuit chip utilizes a P-type substrate, it is necessary to reverse the entire orientation of each of the elements in the control charging circuit. Reference is made to FIG. 4, wherein a charge control circuit that functions in the same manner to achieve the same result as the charge control circuit depicted in FIG. 2, is illustrated, like reference numerals being utilized to denote like elements. The detector is comprised of N-channel transistor 16 and variable resistor 8 which function in the same manner as the variable resistor 8 and P-channel transistor 7 of FIG. 2. Similarly, the comparator is comprised of P-channel transistor 18 and N-channel transistors 17, which transistors control N-channel by-pass transistor 19 in the same manner described above with respect to FIG. 2. It is noted, however, that since a P-type substrate is utilized, diode 5 is coupled intermediate the positive terminal of the secondary battery and the charging device so that each of the voltage detecting and by-pass elements are controlled on the positive side of the secondary battery.

Accordingly, it is noted with respect to FIG. 2 that the threshold voltage level of P-channel transistors 7 and 9 insures that same operate in a saturated state when the voltage level of the comparator circuit, defined by transistors 9 and 10, is about the threshold voltage of the N-channel transistor 10. The voltage level of the secondary battery 1 will approach the voltage level of the charging voltage, until such time as the voltage level across the variable resistor 8 equals the threshold voltage of the N-channel transistor. Stated otherwise, the P-channel transistor must be disposed in a saturated state when the voltage of the solar battery is higher than that of the secondary battery and the voltage level of the secondary battery is less than or equal to the voltage level of the charging voltage, in order to obtain charging of the secondary battery to a sufficient level. Accordingly, in order to obtain this result, the threshold voltages of the P-channel transistor 7 and 9 are selected to be higher than that of the N-channel transistor 10. Similarly, in the charge control circuit depicted in FIG. 4, the threshold voltage of N-channel transistors 16 and 17 is selected to be higher than the threshold voltage of P-channel transistor 18. Accordingly, when P-channel transistor 9, in the circuit depicted in FIG. 2 or N-channel transistor 17 in FIG. 4, are replaced with a resistor, it is only necessary that the threshold voltage level of P-channel transistor 7, in FIG. 2, and corresponding N-channel transistor 16, in FIG. 4, are higher than the threshold level of N-channel transistor 10, in FIG. 2, and P-channel transistor 18, in FIG. 4, respectively.

Figure 5:
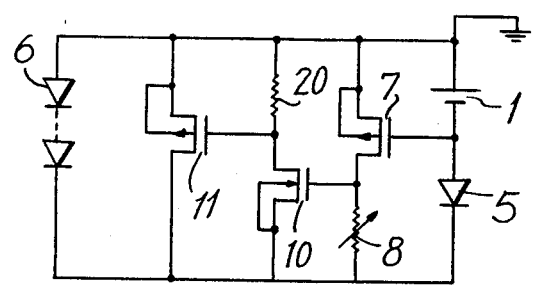
Figure 6:
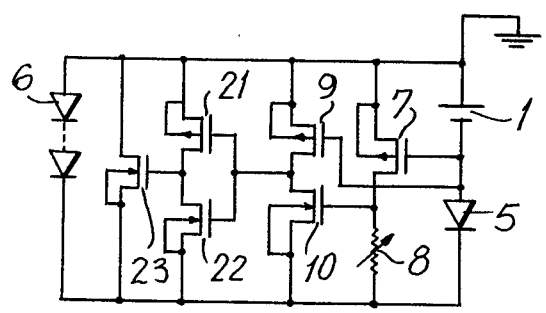
Figure 7:
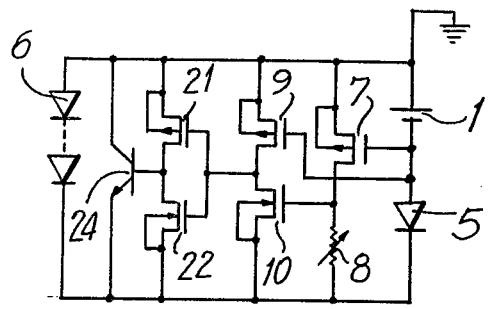

Reference will now be made to FIGS. 5 through 7 wherein three alternative embodiments of the charge control circuit detailed above are respectively depicted. For example, in FIG. 5, an embodiment is depicted wherein a resistor 20 is integrated onto the integrated circuit chip by forming a polycrystalline silicon layer on the IC substrate or alternatively diffusing a resistance layer into the IC substrate. Similarly, as illustrated in FIG. 6, wherein like reference numerals are utilized to denote like elements discussed above, if it is desired to change the polarity of the by-pass transistor, a C-MOS inverter, comprised of P-channel transistor 21 and N-channel transistor 22, can be disposed intermediate the comparator formed of transistors 9 and 10 and the N-channel by-pass transistors 23. Also, as illustrated in FIG. 7, a NPN transistor 24 can be formed in the IC circuit chip by the same method utilized to form the MOS transistors and, hence, can be substituted for the N-channel by-pass transistor 23, illustrated in FIG. 6.

Figure 8:
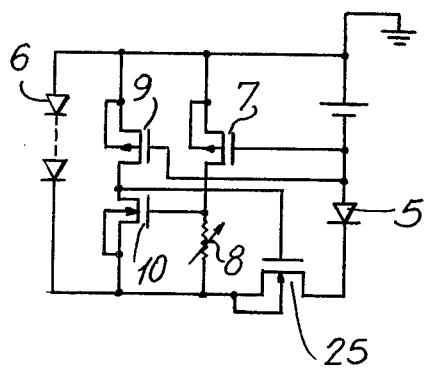
FIG. 8 is a detailed circuit diagram of a charge control circuit constructed in accordance with still a further embodiment of the instant invention.
Figure 9:
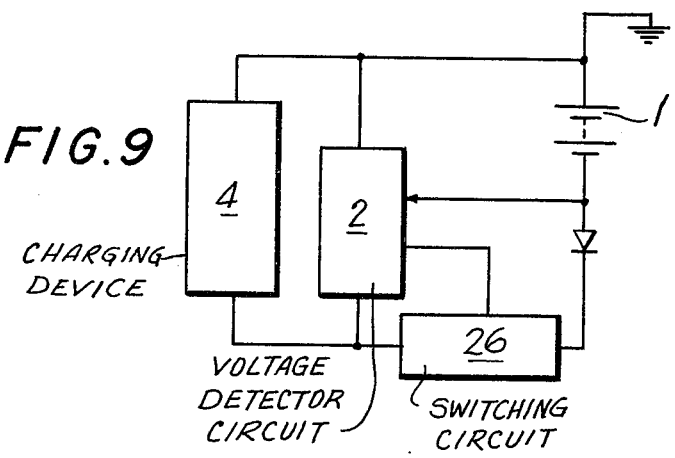
FIG. 9 is a block diagram of the charge control circuit depicted in FIG. 8.

Reference is now made to FIG. 9, wherein a block circuit diagram of a charge control circuit utilizing a switching circuit 26, instead of a by-pass circuit for controlling the application of charging current to the secondary battery 4, is depicted, like reference numerals also being utilized to denote like elements described above. The switching circuit 26 is controlled by detecting circuit 2 in order to selectively apply the charging current supplied by solar battery to the secondary battery, when the switching circuit is turned ON and to prevent the charging current from being applied to secondary battery 1, when the switching circuit is turned OFF. An actual embodiment utilizing each of the circuit elements described in detail above is depicted in FIG. 8, with the N-channel switching transistor 25 being utilized instead of a by-pass transistor in order to inhibit the application of a charging current to the secondary battery 1. Specifically, the gate electrode of N-channel transistor 25 is coupled to the output of the comparator circuit defined by transistors 9 and 10, and in response to the output of the comparator being referenced to the negative potential of the solar battery, the N-channel transistor is turned OFF, thereby preventing a current from being supplied from the solar battery 6 to the secondary battery 1.

Accordingly, the instant invention is particularly characterized by a charge control circuit that detects the voltage level of the secondary battery, and utilizes same to control and regulate the charge current applied thereto by a charging device such as a solar battery, inductive coil or the like. Moreover, because the electronic circuitry utilized in electronic instruments such as wristwatches and calculators are formed on a single IC chip, the charge control circuit in the instant invention is particularly suited to be integrated into the same circuit chip and thereby reduce the cost and difficulty of including same in such electronic instruments. Moreover, because the electronic instruments discussed above utilize liquid crystal displays, the amount of current consumption is sufficiently reduced so that a charge control circuit that provides reduced current consumption is particularly effective. Accordingly, an improved charge control circuit wherein voltage regulation circuitry is disposed intermediate a charging device and the secondary battery to effect regulation of the charging current applied to the secondary battery is provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A charge control circuit comprising voltage supply means adapted to be charged to a predetermined voltage level in response to a charging circuit being applied thereto; charging means adapted to produce a charging current; voltage regulating means disposed intermediate said charging means and said voltage supply means; circuit isolation means for preventing any current flow caused by said voltage supply means, whereby all circuit currents are exclusively supplied from said charging means, said voltage regulating means including voltage detecting means for detecting when said voltage supply means is charged to said predetermined level and in response thereto for producing an inhibit signal, said detecting means being responsive solely to voltage and drawing no current from said supply means, and being connected to receive the voltage at a point between said voltage supply means and said circuit isolation means;

and current inhibit means coupled to said voltage detecting means and to said charging means for inhibiting said charging current supplied by said charging means from being supplied to said voltage supply means when said inhibit signal is applied thereto.

2. A charge control circuit as claimed in claim 1, wherein said current inhibit means includes by-pass circuit means coupled to said voltage detecting means and further coupled across said charging means, said by-pass circuit means being adapted in response to said inhibit signal being applied thereto to shunt said charging current produced by said charging means thereacross.

3. A charge control circuit as claimed in claim 2, wherein said by-pass circuit means includes a transistor switching means, said transistor switching means including a control electrode coupled to said voltage detecting means and first and second current path electrodes coupled in parallel with said charging means for selectively shunting and absorbing the charging current produced thereby when said current inhibit signal is applied to said control electrode thereof.

4. A charge control circuit as claimed in claim 3, wherein said by-pass circuit transistor switching means is an MOS transistor.

5. A charge control circuit as claimed in claim 3, wherein said by-pass circuit transistor switching means is a bipolar transistor.

6. A charge control circuit as claimed in claim 1, wherein said current inhibit means includes switching means coupled in series between said charging means and said voltage supply means, said switching means being adapted to cut-off the flow of said charging current supplied by said charging means to said voltage supply means in response to said inhibit signal being applied thereto.

7. A charge control circuit as claimed in claim 6, wherein said switching means includes a switching transistor having a control electrode coupled to said voltage detecting means and first and second current path electrodes coupled in series with said charging means and said voltage supply means for selectively cutting-off the charging current produced by said charging means in response to said current inhibit signal being applied to said control electrode thereof.

8. A charge control circuit comprising voltage supply means adapted to be charged to a predetermined voltage level in response to a charging circuit being applied thereto, charging means adapted to produce a charging current, voltage regulating means disposed intermediate said charging means and said voltage supply means, said voltage regulating means including voltage detecting means for detecting when said voltage supply means is charged to said predetermined level, said voltage detecting means including comparator means referenced to the voltage level of said voltage supply means and when said voltage supply means is charged to said predetermined level, in response thereto, said comparator means being adapted to produce a current inhibit signal, and current inhibit means coupled to said voltage detecting means and to said charging means for inhibiting said charging current supplied by said charging means from being supplied to said voltage supply means when said inhibit signal is applied thereto, said voltage detecting means further including a voltage level converted coupled intermediate said comparator and said voltage supply for converting said voltage of said voltage supply means to a control voltage for controlling said comparator circuit means; said comparator circuit means, voltage converter means and current inhibit circuit means, are each comprised of insulating gate field-effect transistors.

9. A charge control circuit comprising voltage supply means adapted to be charged to a predetermined voltage level in response to a charging circuit being applied thereto, charging means adapted to produce a charging current, voltage regulating means disposed intermediate said charging means and said voltage supply means, said voltage regulating means including voltage detecting means for detecting when said voltage supply means is charged to said predetermined level, said voltage detecting means including comparator means referenced to the voltage level of said voltage supply means and when said voltage supply means is charged to said predetermined level, in response thereto, said comparator means being adapted to produce a current inhibit signal, and current inhibit means coupled to said voltage detecting means and to said charging means for inhibiting said charging current supplied by said charging means from being supplied to said voltage supply means when said inhibit signal is applied thereto, said voltage detecting means further including a voltage level converter coupled intermediate said comparator and said voltage supply for converting said voltage of said voltage supply means to a control voltage for controlling said comparator circuit means, said voltage supply means including first and second terminals, said voltage converter means including an insulated gate field-effect detecting transistor, the gate electrode of said detecting transistor being coupled to said first terminal of said voltage supply means, said second terminal being coupled to a reference potential, so that said gate electrode of said voltage converter transistor detects when said voltage supply means is charged to said predetermined voltage level.

10. A charge control circuit as claimed in claim 9, wherein said gate electrode of said insulated gate field-effect detecting transistor operates in said current saturation region when the voltage level of said voltage supply means is lower than the voltage level of said charging means and charging current.

11. A charge control circuit as claimed in claim 9, wherein said detecting transistor means is a P-channel MOS transistor formed on an N-type substrate, said second terminal of said voltage supply means being referenced to ground, and said first terminal of said voltage supply means being referenced negatively with respect to said reference potential.

12. A charge control circuit as claimed in claim 9, wherein said second terminal of said voltage supply means is referenced to ground, and said first terminal of said voltage supply means is positive with respect to ground, and said detecting transistor means is an N-channel MOS transistor integrated into a P-type substrate.

13. A charge control circuit as claimed in claim 9, wherein said second terminal of said voltage supply means includes a positive anode terminal and said first terminal is a negative cathode terminal, said detecting transistor means and comparator transistor means being integrated on an N-type substrate, and a diode disposed intermediate said cathode terminal of said voltage supply means and said charging means for preventing reverse currents when said charging current is applied to said voltage supply means.

14. A charge control circuit as claimed in claim 9, wherein said first terminal voltage supply means is a positive anode terminal and said second terminal is a negative cathode terminal, said detecting and comparator transistors being integrated into a P-type substrate, and diode means for preventing reverse currents coupled intermediate said positive anode electrode of said battery and said charging means.

15. A charge control circuit as claimed in claim 11, wherein the threshold voltage of said P-channel detecting transistors is higher than the threshold level of said N-channel transistor integrated into an said N-type substrate.

16. A charge control circuit as claimed in claim 12, wherein the threshold voltage level of said N-channel detecting transistor is greater than the threshold level of said P-channel transistor integrated into a P-type substrate.

17. A charge control circuit as claimed in claim 1, 8, 9 or 19, wherein said charging means is a solar battery.

18. A charge control circuit as claimed in claim 17, wherein said voltage supply means is a secondary battery for supplying a secondary supply voltage to an electronic instrument.

19. A charge control circuit comprising: voltage supply means adapted to be charged to a predetermined voltage level in response to a charging circuit being applied thereto; charging means adapted to produce a charging current; voltage regulating means disposed intermediate said charging means and said voltage supply means; and circuit isolation means for preventing any current flow caused by said voltage supply means, whereby all circuit currents are exclusively supplied from said charging means, said voltage regulating means including voltage detecting means, said detecting means being responsive solely to voltage and drawing no current from said supply means and connected to receive the voltage at a point between said voltage supply means and said circuit isolation means for directly detecting the voltage level of said supply means and in response thereto regulating the application of said charging current to said voltage supply means.

20. A charge control circuit as claimed in claim 1 or 17, wherein said circuit isolation means is a diode.

21. A charge control circuit as claimed in claim 1, 8, 9, or 19 and further comprising means for selecting the value of said predetermined voltage level.

22. A charge control circuit as claimed in claim 21, wherein said means for selecting the value of said predetermined voltage level is a variable resistor.

23. A charge control circuit as claimed in claim 1, wherein said voltage detecting means includes comparator means referenced to the voltage level of said voltage supply means, and when said voltage supply means is charged to said predetermined level, in response thereto, said comparator means being adapted to produce a current inhibit signal.

24. A charge control circuit as claimed in claim 23, wherein said voltage detecting means includes a voltage level converter coupled intermediate said comparator and said voltage supply for converting said voltage of said voltage supply means to a control for controlling said comparator circuit means.

* * * * *